(12) United States Patent
Lou et al.

(10) Patent No.: US 11,374,819 B2
(45) Date of Patent: Jun. 28, 2022

(54) SYSTEMS AND METHODS FOR CREATING VIRTUAL DEVICES

(71) Applicant: Wyze Labs, Inc., Kirkland, WA (US)

(72) Inventors: Yeqing Lou, Redmond, WA (US); Mark Tan, Seattle, WA (US); Yun Zhang, Bothell, WA (US); Dongsheng Song, Bothell, WA (US)

(73) Assignee: Wyze Labs, Inc., Kirkland, WA (US)

( * ) Notice: Subject to any disclaimer, the term of this patent is extended or adjusted under 35 U.S.C. 154(b) by 0 days.

(21) Appl. No.: 17/163,013

(22) Filed: Jan. 29, 2021

(65) Prior Publication Data

US 2021/0243084 A1  Aug. 5, 2021

Related U.S. Application Data

(60) Provisional application No. 62/968,558, filed on Jan. 31, 2020.

(51) Int. Cl.
*H04L 41/0893* (2022.01)
*G06F 9/455* (2018.01)
(Continued)

(52) U.S. Cl.
CPC ........ *H04L 41/0893* (2013.01); *G06F 3/0482* (2013.01); *G06F 9/455* (2013.01); *G06N 20/00* (2019.01); *G16Y 40/35* (2020.01); *H04L 12/282* (2013.01); *H04L 41/0681* (2013.01); *H04L 41/0806* (2013.01); *H04L 41/0873* (2013.01); *H04L 41/22* (2013.01); *H04L 2012/285* (2013.01)

(58) Field of Classification Search
CPC .............. H04L 41/0893; H04L 12/282; H04L 41/0681; H04L 41/0806; H04L 41/0873; H04L 41/22; H04L 2012/285; H04L 41/12; G06F 3/0482; G06F 9/455; G06F 3/04847; G06F 3/0488; G06F 9/451; G06F 9/5072; G06N 20/00; G16Y 40/35
See application file for complete search history.

(56) References Cited

U.S. PATENT DOCUMENTS

2013/0152047 A1* 6/2013 Moorthi ................ G06F 11/368
717/124
2014/0358825 A1* 12/2014 Phillipps ............ G06Q 30/0241
706/11

(Continued)

*Primary Examiner* — Michael Won
(74) *Attorney, Agent, or Firm* — Perkins Coie LLP

(57) ABSTRACT

A virtual device management system for creating and implementing virtual devices and associated methods are provided herein. The system presents to a user a list of devices available for combining to create the virtual device. When the system receives from the user a selection of two or more devices that the user wishes to combine to create the virtual device, the system presents to the user a list of available functions that can be performed by the virtual device based on the selected devices. The system then receives from the user a selection of one or more functions and configures the virtual device to perform the selected functions. The system can also be configured to present, via a user interface via a mobile application running on a user device, a plurality of virtual devices with predetermined functionalities that are created by detecting the various connected devices within an IoT network.

20 Claims, 11 Drawing Sheets

(51) Int. Cl.
*G06N 20/00* (2019.01)
*G06F 3/0482* (2013.01)
*H04L 41/0806* (2022.01)
*H04L 41/0873* (2022.01)
*H04L 41/0681* (2022.01)
*H04L 12/28* (2006.01)
*G16Y 40/35* (2020.01)
*H04L 41/22* (2022.01)

(56) References Cited

U.S. PATENT DOCUMENTS

| | | | |
|---|---|---|---|
| 2019/0273635 A1* | 9/2019 | Mcnamee | H04W 4/24 |
| 2020/0019493 A1* | 1/2020 | Ramakrishna | G06F 11/3688 |
| 2020/0117886 A1 | 4/2020 | Kastaniotis et al. | |
| 2020/0320845 A1* | 10/2020 | Livny | G08B 5/222 |
| 2021/0243084 A1* | 8/2021 | Lou | H04L 41/0806 |
| 2021/0263779 A1* | 8/2021 | Haghighat | G06F 11/3409 |

* cited by examiner

SYSTEMS AND METHODS FOR CREATING VIRTUAL DEVICES

CROSS-REFERENCE TO RELATED APPLICATION(S)

The application claims priority to and the benefit of U.S. Provisional patent Application No. 62/968,558, filed Jan. 31, 2020, which is incorporated herein by reference in its entirety.

TECHNICAL FIELD

The present disclosure relates generally to the Internet of Things (IoT) and smart home systems, and more particularly to systems and methods for creating virtual devices using the functionality of multiple physical devices.

BACKGROUND

The Internet of Things (IoT) technology has prompted explosive growth of devices connected and controlled by the Internet. With smart home technology, for example, lights, thermostats, outlets, appliances, and other electronic devices are connected to one or more smart home network systems, allowing a user to manage and control these devices remotely from any internet-connected location using a mobile application (also referred to as a "mobile app" or "app"). Typically, each smart home device manufacturer provides its own smart home app and, therefore, users with smart home devices from multiple different manufacturers have separate apps on their mobile devices (e.g., smart phones, tablets) that correlate to the various device manufacturers. For example, a consumer may have a first smart home app associated with Manufacturer A to control lights and electrical outlets, a second app associated with Manufacturer B to control smart cameras, and a third app associated with Manufacturer C to control a smart door lock. Some smart home devices from different manufacturers may be in communication with a singular virtual assistant (e.g., Alexa, Siri, Cortana, Google Assistant), though each device is still managed and controlled separately. Regardless of whether the smart home devices are tied to the same or different apps, each device is controlled and operated independently of the others.

DETAILED DESCRIPTION

Figure 1:
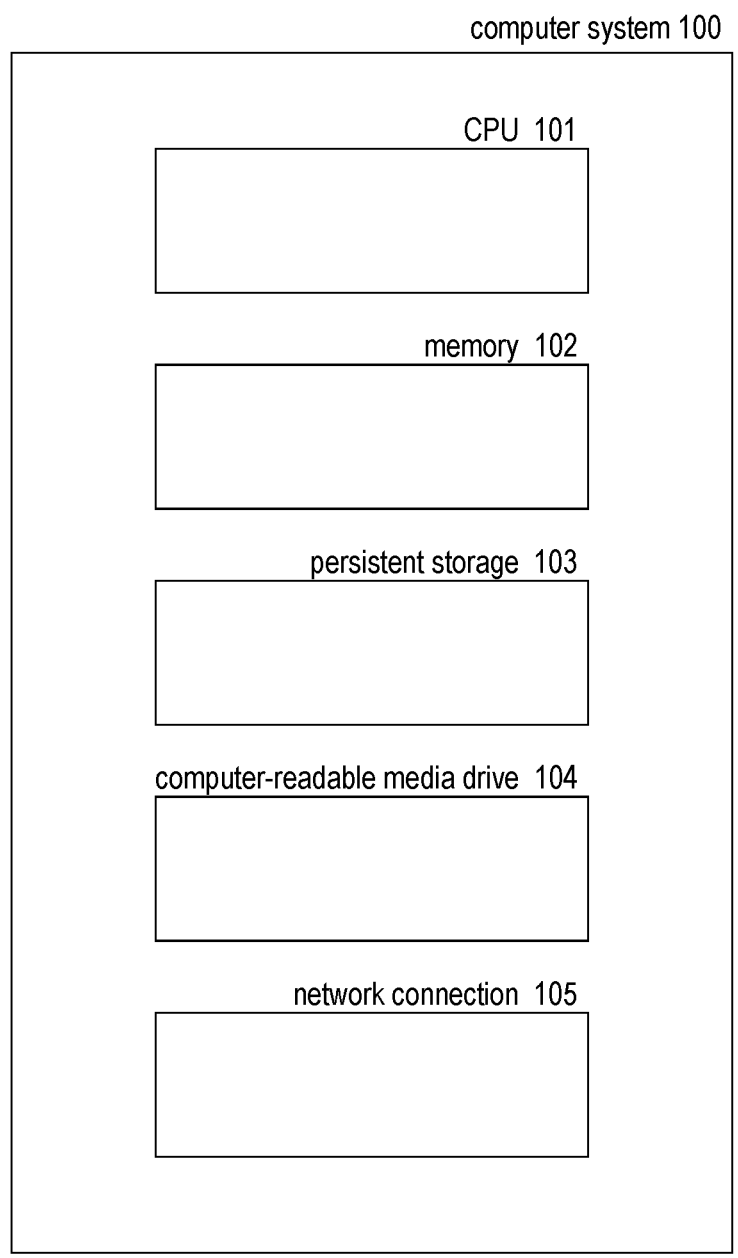
FIG. 1 is a block diagram showing some of components typically incorporated in at least some of the computer systems and other devices on which a virtual device management ("VDM") system is configured to operate.

Systems and methods for creating virtual devices are disclosed herein. The present technology provides for IoT services or functions that combine the capabilities of two or more separate smart devices (also referred to as "products"). That is, the present technology solves an access management problem of smart home devices by not tying their functionality to the devices themselves. Instead, the functions of the individual devices (e.g., lights, camera, doorbell, lock, sensor) are extracted from the devices, identified as capabilities, and these capabilities can be combined together to create a "virtual product" that provides a desired combination of functions. For example, a new virtual product can combine the features of a smart lock and a smart doorbell or camera. The VDM system can extract the lock's lock/unlock function with doorbell's video stream and push to talk functions, allowing the user to access these functions via a single virtual device interface. When a user (e.g., a consumer) interacts with this new virtual product, the user can unlock door by pressing a "lock/unlock" icon on a user interface (e.g., a touch screen on a phone or tablet) at the same time as he/she is talking with the visitor and/or seeing the video streaming of the visitor. In these and other embodiments, the VDM system can extract functions from multiple products to form automation rules. For example, a consumer may want a door lock to open automatically when it recognizes a certain person. One way to accomplish this is to create a new device that physically combines a door lock and a camera that can perform the functions of the individual devices (e.g., a door lock that has a camera). But creating a new physical device is expensive and may be impracticable due to various physical barriers or constraints. In addition, the technical capabilities of one or both separate devices may be compromised to provide the joined product. In the case of the camera-lock example, the camera itself may not have the same degree of clarity and/or subpar vantage point for facial recognition in comparison to a camera de-coupled from the door lock. The present technology, however, provides this desired solution via a software program that can extract the functionality of the separate physical devices to provide the desired functionality and can do so without sacrificing the operability of the individual devices. Furthermore, the combined function or service may provide an additional value or solution that the hardware devices alone could not provide in their separate state.

In some embodiments, a VDM system extracts functions from multiple products and presents to a user a list of functions and/or devices that can be selectively combined with each other to create a virtual device and/or to define an automation rule. The devices may include, for example, a camera, a light bulb, a motion sensor, a contact sensor, a door lock, an electrical outlet, a speaker, and so on. The extracted functions may include those specifically tied to each device, such as lock/unlock door, video/live stream, two-way audio, light on/off, motion detection, contact detection, power on/off, and so on. Using the extracted functions, the VDM system may create a curated list of predefined virtual devices for the user. For example, after extracting the lock/unlock feature of a door lock and the video stream and "push to talk" feature of a doorbell, the VDM system can provide a predefined virtual product that allows the user to unlock the door (e.g., by pressing an icon on a user interface) while talking with the visitor, without the need to toggle between different device-specific user interfaces. In various embodiments, the VDM system receives from the user a selection of devices that the user wishes to combine to create a virtual device, the VDM system presents to the user a list of functions, such as automation rules or combined capabilities (e.g., controlling light or lock while in live stream video), that can be performed by the virtual device based on the selected devices. For example, if the user selects a motion sensor, a light bulb, and/or a camera, the hybrid functions may include the ability to turn on/off the light while view a live stream video (e.g., via an icon on the UI or touching the light itself on the livestream). As a further example, the hybrid automation rules may include: "when the motion sensor detects motion, turn on the light bulb," "when the motion sensor stays clear for 15 minutes, turn off the light bulb," "when the motion sensor detects motion, use the camera to identify a type of motion, turn on the light bulb depending upon the identified type of motion," and/or "when the motion sensor detects motion, use the camera to identify the person causing the motion, turn on the light bulb to preferred settings of the individual identified via the camera or set the light bulb to preferred settings of the identified individual." The VDM system then receives from the user a selection of one or more functions and configures the virtual device to perform the selected functions via communication with two or more physical devices.

By breaking down physical devices into software features and combining them to be represented as a unique virtual device that is distinct from its physical counterparts, the VDM system enables users to execute a series of functions from multiple physical devices without having to separately access each of the physical devices, resulting in enhancement of the services or value provided by these devices, efficiency improvements in managing these devices, economic benefits, and reduced human exertions. Further, the VDM system overcomes the barriers and constraints associated with physically combining different devices to perform a desired function.

In some embodiments, the VDM system may allow the user to define new functions to be performed by a virtual device in addition to or instead of selecting from a list of predefined functions, and/or allow the user to define a new virtual device entirely. In some embodiments, for example, a virtual device comprised of a camera and a light bulb, and the user can define a new automation function that dims the light to 50% brightness after the camera does not record motion for 10 minutes and turns the light off after the camera stays clear for another 5 minutes. The VDM system may also allow the user to modify the predefined functions. For example, the user can modify the duration for which the camera has to stay clear before the light bulb is turned off. As a further example, the user can define a new virtual device comprising a camera and a plurality of electronic devices (e.g., speakers, lamps, electrical outlets) in a room, and determine how the devices can be switched on/off or otherwise controlled (e.g., by touching each device on a live stream video, touching device-specific icon controls on the live stream user interface, touching an icon that operates all the devices together).

In some embodiments, when combining devices to create a virtual device, the VDM system may check a logical or spatial relationship of the devices to ensure that combining them makes sense and/or that they can work together. Continuing with the above example with a motion sensor and a light bulb, if the motion sensor and the light bulb were in different rooms, combining their functions would not provide the desired ability and the result would be nonsensical (i.e., turning on a light in a different room from the detected motion). Accordingly, the VDM system may have features that check whether the motion sensor and the light bulb are in the same room and/or otherwise logically tied to each other and alert the user if the logical spatial relationship does not exist. For example, the devices can communicate with each other (e.g., by performing an electronic handshake), the home network, and/or the VDM system to automatically determine relative spatial relationships. In some embodiments, when the user selects a device, the VDM system may automatically disable (e.g., gray out) devices that are incompatible to be combined with the selected device.

In some embodiments, the VDM system may present to the user (e.g., on a user interface) a curated list of predefined recipes (also referred to as "tools," "hybrid tools" or "hybrid recipes") that are enabled via the virtual devices. These recipes are intended to provide the user with suggestions for combining devices and/or tasks to facilitate the creation of a virtual device. The VDM system may provide these recipes based on various factors, such as common use cases, hybrid tools other users in the network have created, frequency of use, actions frequently performed by the user, etc. For example, the VDM system may provide the top three recipes that are most frequently used among all users. When the user selects a recipe, the VDM system displays detailed information about that recipe, including a descriptive image, a description, ingredients (i.e., individual devices that make up the virtual device), etc. In this way, the VDM system can educate the user about the virtual device and help the user decide whether to create the virtual device.

In some embodiments, the VDM system may proactively suggest a recipe or virtual device based on analysis of actions frequently performed by the user (i.e., pattern recognition or signal detection). For example, the VDM system may recognize that whenever a certain person stands in front of a front door, the door is unlocked within a certain time period (e.g., 30 seconds). The VDM system may then suggest a virtual device combining the camera and the door lock. To detect a pattern or signal in the user data, the VDM system generates a set of devices and a set of actions, each action involving a subset of the devices. Each action may be represented by a feature vector that includes values for features derived from that action. For example, the features may include the devices used, the time of the action, the location of the action, and so on. The VDM may then apply various machine learning techniques to the generated feature vectors to recommend a virtual device. The machine learning techniques can be of various types such as supervised, semi-supervised, unsupervised, and reinforcement learning, including Nearest Neighbor, Naïve Bayes, Decision Trees, Linear Regression, Support Vector Machines, Neural Networks, K-means Clustering, Association Rules, Q-Learning, Temporal Difference, Deep Adversarial Networks, etc.

FIG. 1 is a block diagram showing some of components typically incorporated in at least some of the computer systems and other devices on which the VDM system is configured to operate. In various embodiments, these computer systems and other devices 100 can include server computer systems, desktop computer systems, laptop computer systems, netbooks, mobile phones, personal digital assistants, televisions, cameras, automobile computers, electronic media players, etc. In various embodiments, the computer systems and devices include zero or more of each of the following: a central processing unit (CPU) 101 for executing computer programs; a computer memory 102 for storing programs and data while they are being used, an operating system including a kernel, and device drivers; a persistent storage device 103, such as a hard drive or flash drive for persistently storing programs and data; a computer-readable media drive 104 that are tangible storage means that do not include a transitory, propagating signal, such as a floppy, CD-ROM, or DVD drive, for reading programs and data stored on a computer-readable medium; and a network connection 105 for connecting the computer system to other computer systems to send and/or receive data, such as via the Internet or another network and its networking hardware, such as switches, routers, repeaters, electrical cables and optical fibers, light emitters and receivers, radio transmitters and receivers, and the like. While computer systems configured as described above are typically used to support the operation of the VDM system, those skilled in the art will appreciate that the VDM system may be implemented using devices of various types and configurations and having various components.

Figure 2:
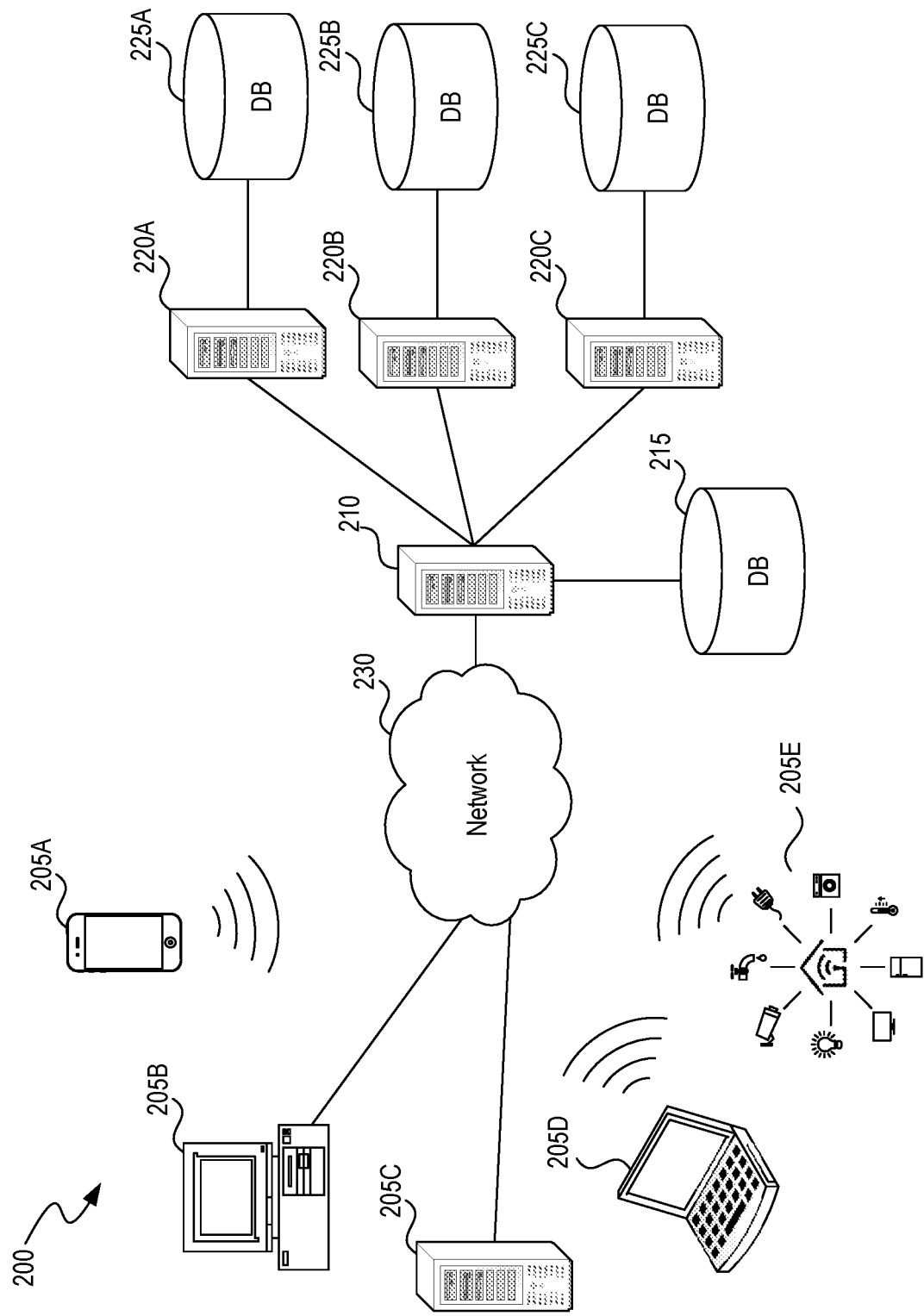
FIG. 2 is a system diagram illustrating an example of a computing environment in which a VDM system configured in accordance with some embodiments of the present technology can operate.

FIG. 2 is a system diagram illustrating an example of a computing environment in which the VDM system operates in some embodiments. In some implementations, environment 200 includes one or more client computing devices 205A-E, examples of which can include computer system 100. Client computing devices 205, including smart home devices 205E, operate in a networked environment using logical connections (e.g., a server 210) through network 230 to one or more remote computers, such as a server computing device.

In some implementations, server 210 is an edge server which receives client requests and coordinates fulfillment of those requests through other servers, such as servers 220A-C. In some implementations, server computing devices 210 and 220 comprise computing systems, such as computer system 100. Though each server computing device 210 and 220 is displayed logically as a single server, server computing devices can each be a distributed computing environment encompassing multiple computing devices located at the same or at geographically disparate physical locations. In some implementations, each server 220 corresponds to a group of servers.

Client computing devices 205 and server computing devices 210 and 220 can each act as a server or client to other server or client devices. In some implementations, servers (210, 220A-C) connect to a corresponding database (215, 225A-C). As discussed above, each server 220 can correspond to a group of servers, and each of these servers can share a database or can have its own database. Databases 215 and 225 warehouse (e.g., store) information such as device data, user data, feature vectors describing user actions, and so on. Though databases 215 and 225 are displayed logically as single units, databases 215 and 225 can each be a distributed computing environment encompassing multiple computing devices, can be located within their corresponding server, or can be located at the same or at geographically disparate physical locations.

Network 230 can be a local area network (LAN) or a wide area network (WAN) but can also be other wired or wireless networks. In some implementations, network 230 is the Internet or some other public or private network. Client computing devices 205 are connected to network 230 through a network interface, such as by wired or wireless communication. While the connections between server 210 and servers 220 are shown as separate connections, these connections can be any kind of local, wide area, wired, or wireless network, including network 230 or a separate public or private network.

Figure 3:
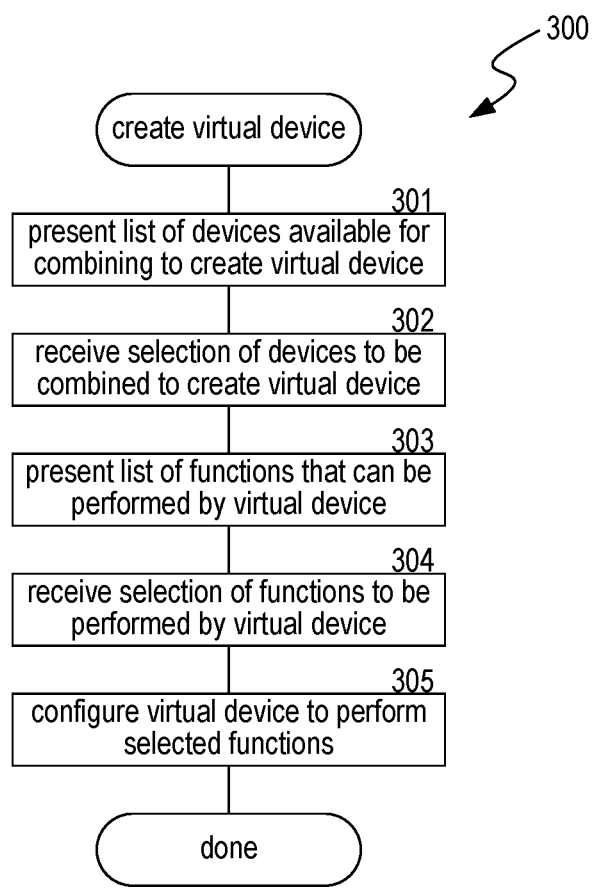
FIG. 3 is a flow diagram illustrating a process of creating a virtual device using a VDM system configured in accordance with some embodiments of the present technology.

FIG. 3 is a flow diagram illustrating a process 300 of creating a virtual device using the VDM system in some embodiments. Process 300 can be executed by a processing device in accordance with computer-executable instructions stored on a computer-readable medium. For example, process 300 can be executed by application software running on the VDM system and/or other processing devices. Those skilled in the relevant art will appreciate that aspects of process 300 can be practiced with other communications, data processing, or computing system configurations. In block 301, process 300 starts by presenting to a user a list of devices available for combining to create a virtual device. The devices may include, for example, a camera, a light bulb, a motion sensor, a contact sensor, a door lock, and so on. The devices may be products of different manufacturers and even virtual devices themselves. Process 300 may present the list of available devices via a graphical user interface (GUI) on the user's device (e.g., a smartphone, a tablet, etc.). In block 302, process 300 receives from the user a selection of devices to be combined to create a virtual device. Upon receiving the selection, process 300 may check compatibility of the selected devices to ensure that combining them make sense and/or that they can work together. In block 303, process 300 presents to the user a list of functions that can be performed by the virtual device based on the selected devices. Additionally or alternatively, process 300 may allow the user to create new functions. In block 304, process 300 receives from the user a selection of one or more functions. In block 305, process 300 configures the virtual device to perform the selected functions and then completes.

Figure 4:
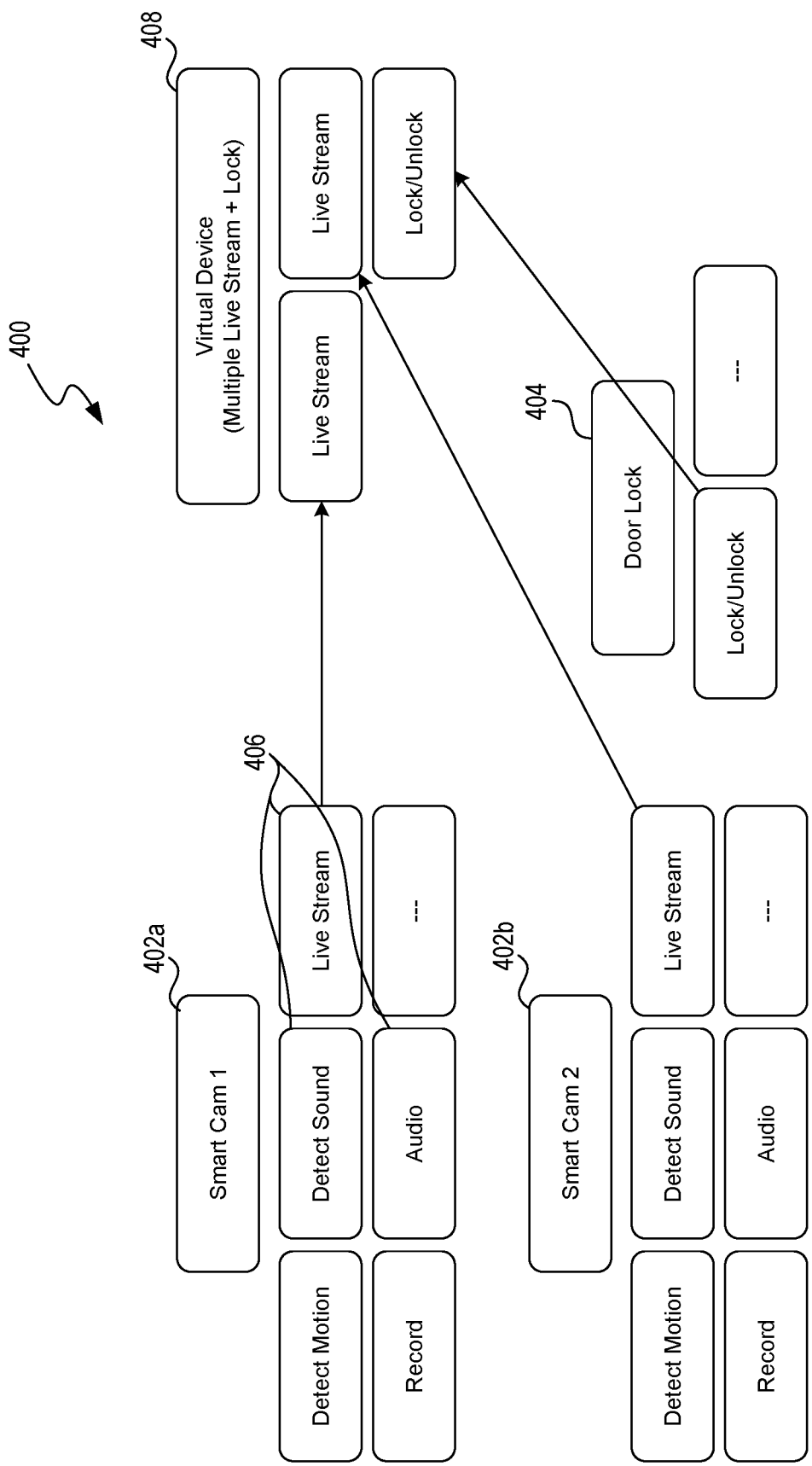
FIG. 4 is a schematic diagram illustrating the creation of a virtual device in a VDM system in accordance with embodiments of the present technology.

FIG. 4 is a schematic diagram illustrating the creation of a virtual device in a VDM system 400 in accordance with embodiments of the present technology. The VDM system 400 includes one or more connected physical devices with a combination of abilities and segments these physical devices into their various abilities. Once separated into their individual abilities, the VDM system 400 can then communicate with the physical devices to execute the one or more of the identified abilities manually or in an automated fashion. The VDM system 400 can also combine one or more of the abilities to define the virtual device. As shown in FIG. 4, for example, the VDM system 400 may include a first smart camera 402a, a second smart camera 402b (identified together as "smart cameras 402"), and a door lock 404. The VDM system 400 has segmented each of the smart cameras 402 into their individual capabilities 406, including detect motion, detect sound, live stream, record, and/or audio (e.g., two-way audio), and the door lock 404 into its capability (ies). Each of these extracted abilities 406 can be combined with one or more other extracted abilities 406 to create a virtual device 408. In the embodiment illustrated in FIG. 4, the virtual device 408 includes multiple live streams and a door lock/unlock associated with the live stream of the second smart camera 402*b*. In some embodiments, the virtual device 408 can include one or more other extracted abilities 406 to provide various different features. Accordingly, virtual devices provide combinations of abilities to provide a desired solution without being limited or defined by any physical structure. Thus, the VDM system 400 provides flexibility in combining different abilities in a manner that is scenario-centric rather than device-centric.

Figure 5B:
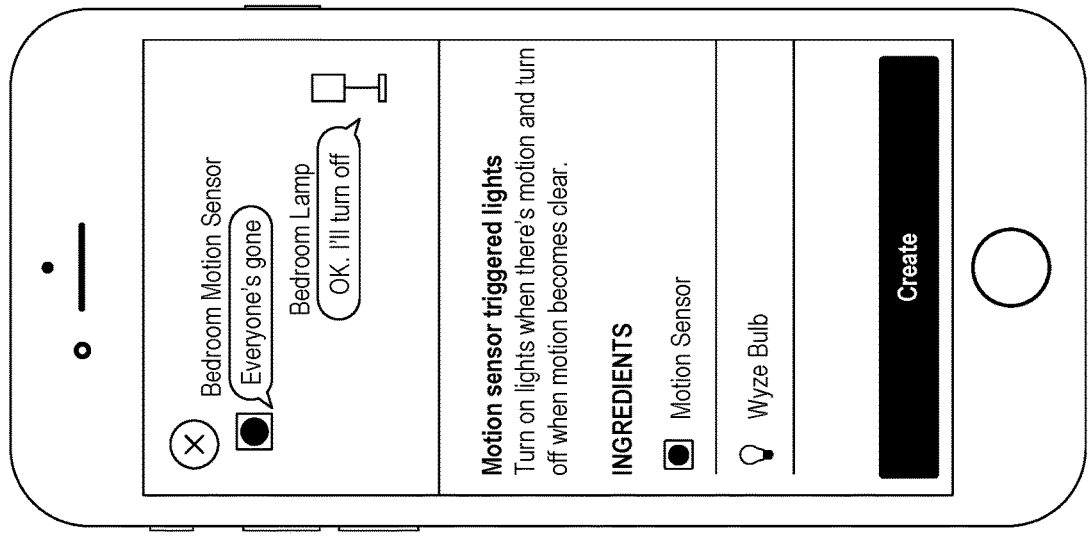
FIGS. 5A and 5B are display diagrams illustrating a virtual device discovery in accordance with some embodiments of the present technology.
Figure 5A:
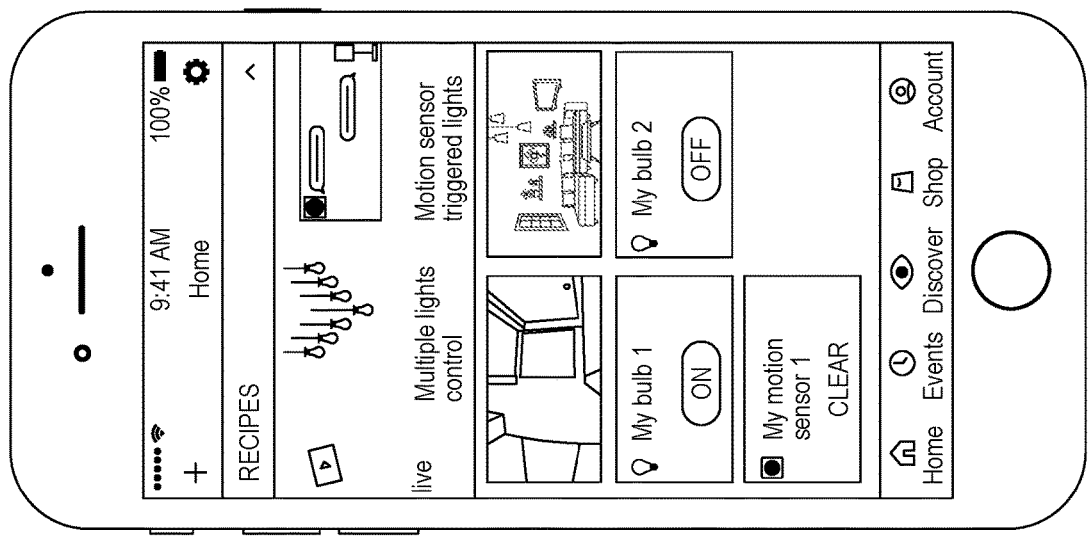
Figures 8A, 8B, 8C, 8D:
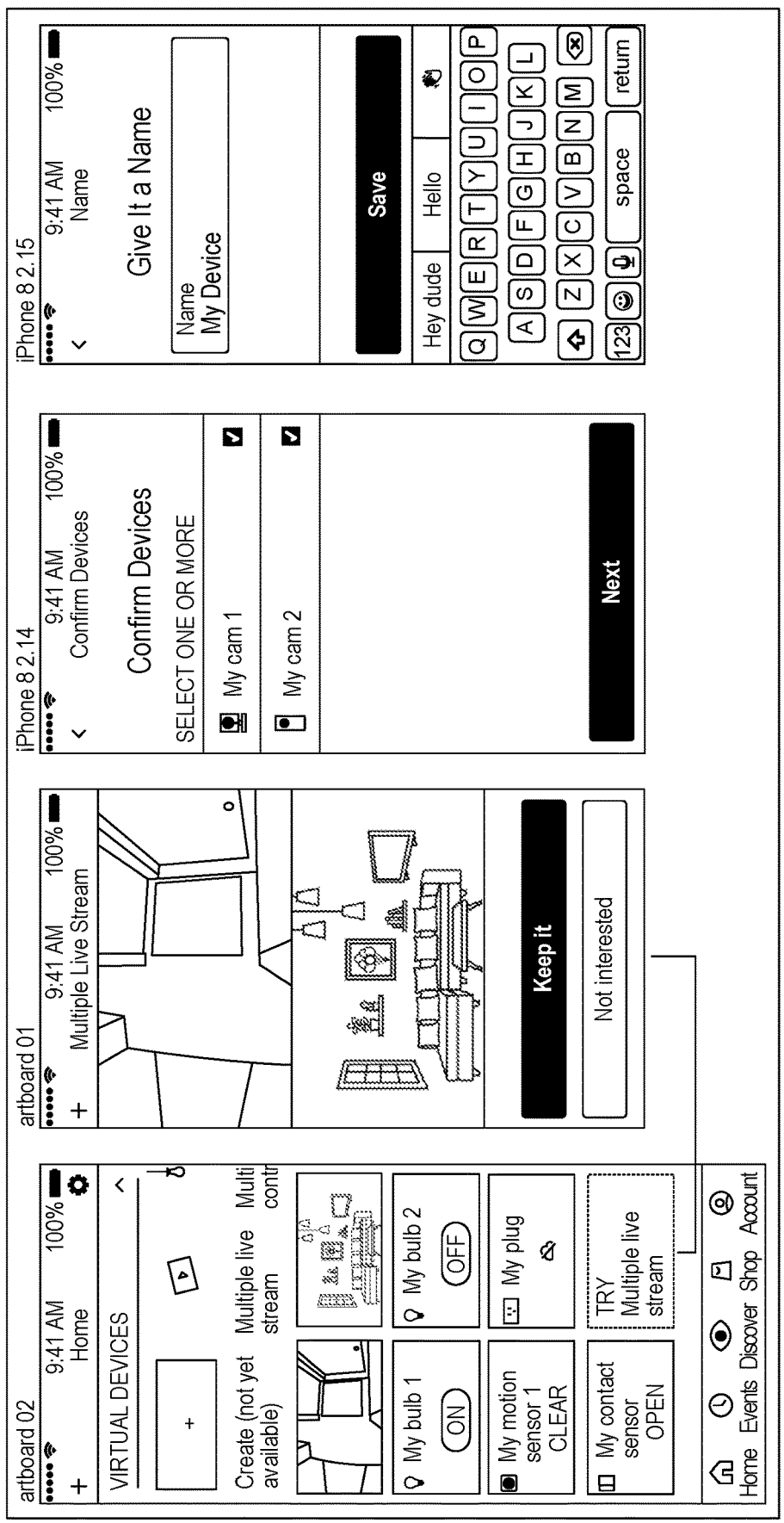
FIGS. 8A-8D are display diagrams illustrating a process of creating a virtual device based on a recipe suggested by the VDM system in accordance with some embodiments of the present technology.

FIGS. 5A and 5B are display diagrams illustrating a virtual device discovery in some embodiments. The virtual device discovery informs a user about different recipes for combining devices and their uses and/or benefits. FIG. 5A is a recipe home screen that includes a list of predefined recipes (e.g., multiple lights control, motion sensor triggered lights, etc.). Additionally, the recipe home screen can include a create option (as shown in FIG. 8A) that allows a user to create a new recipe instead of selecting one from the predefined recipes. The recipe home screen can also suggest a recipe for a user to try (e.g., multiple live stream) as shown in FIG. 8B. Under the list of predefined recipes, the recipe home screen shows available devices with their current states. In the illustrated example, two cameras with their current views, my bulb 1 (*on*), my bulb 2 (off), and my motion sensor 1 (clear) are shown. When a user selects a recipe, the VDM system displays a recipe information screen (FIG. 5B) that shows information about the selected recipe, including a descriptive image, a brief description, and ingredients of the recipe.

Figure 6A:
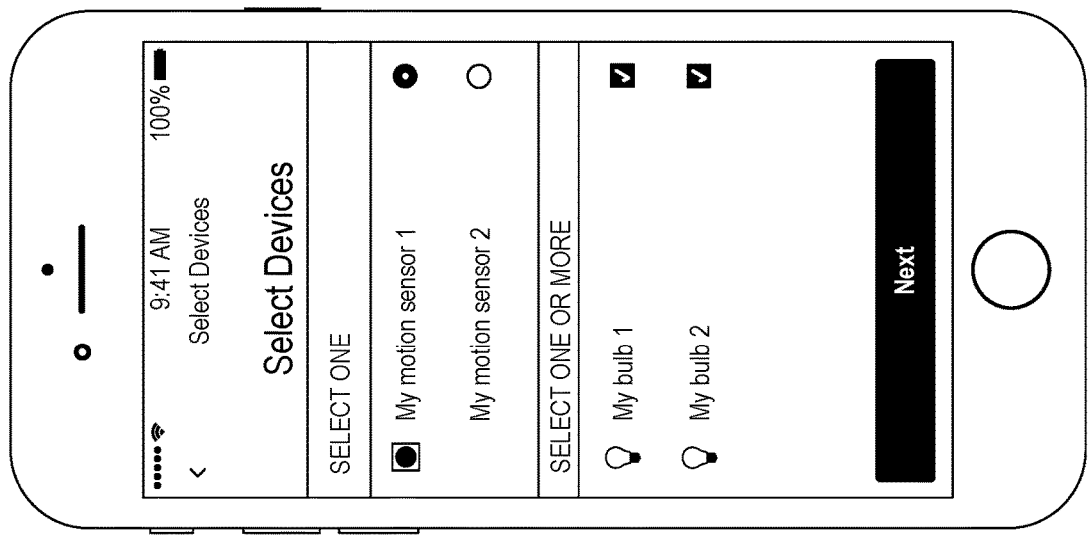
FIGS. 6A and 6B are display diagrams illustrating creation of a virtual device in accordance with some embodiments of the present technology.
Figure 6B:
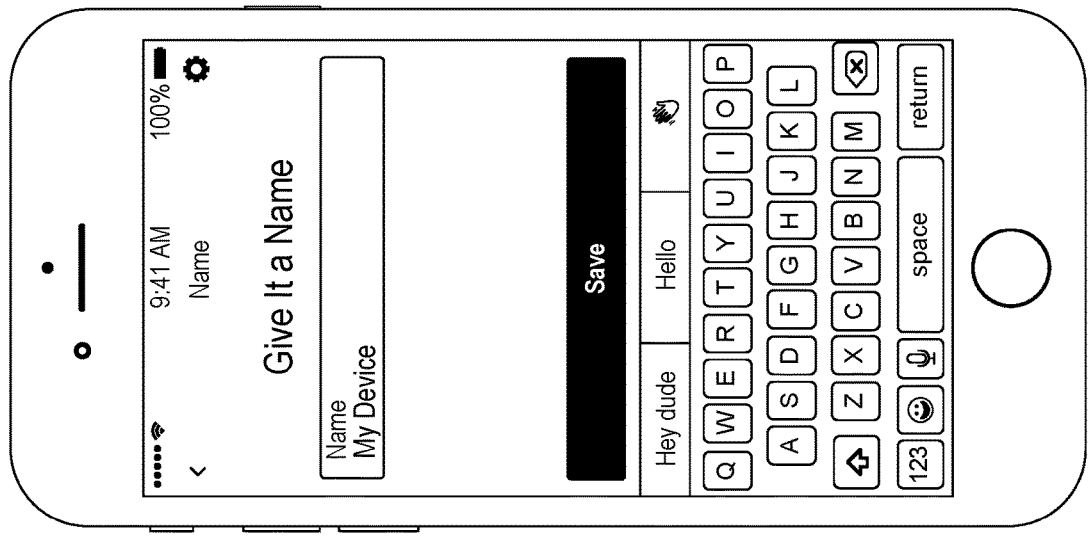

FIGS. 6A and 6B are display diagrams illustrating creation of a virtual device in some embodiments. FIG. 6A is a device selection screen that shows available devices that a user can combine to create a virtual device. Once the user selects a desired combination of devices and touches next, the VDM system displays a device name screen (FIG. 6B) that allows the user to enter a name for the virtual device being created.

Figure 7:
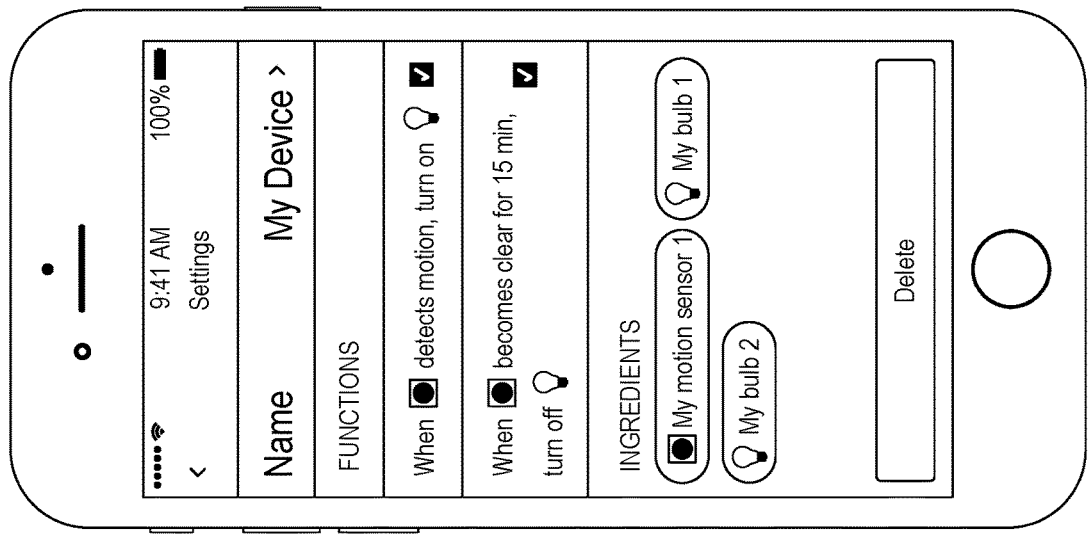
FIG. 7 is a display diagram illustrating a recipe settings screen in accordance with some embodiments of the present technology.

FIG. 7 is a display diagram illustrating a recipe settings screen in some embodiments. The recipe settings screen includes the name, functions, and ingredients of the recipe. A user may select or deselect the functions, for example, by checking or unchecking the corresponding boxes. Although not shown in this diagram, a user can also update/modify the functions or even create new functions. Additionally, a user can delete the selected recipe by touching the delete button at the bottom of the screen.

FIGS. 8A-8D are display diagrams illustrating a process of creating a virtual device based on a recipe suggested by the VDM system. FIG. 8A is a recipe home screen that includes a suggestion that the user try a multiple live stream device. The VDM system can make the suggestion based on analysis of user actions or patterns as described above. When the user selects the multiple live stream device, the VDM system displays a device preview screen (FIG. 8B) that shows a preview of what the device would look like and/or how the device would operate. The device preview screen includes options that allow the user to keep or discard the device. If the user chooses to keep the device, the VDM system displays a device confirmation screen (FIG. 8C) similar to the device selection screen shown in FIG. 6A, where the user can add or remove devices, for example, by selecting or deselecting the corresponding check boxes. Once the user confirms the selection of devices, the VDM system displays a device name screen (FIG. 8D) where the user can enter a name for the device.

Figure 9A:
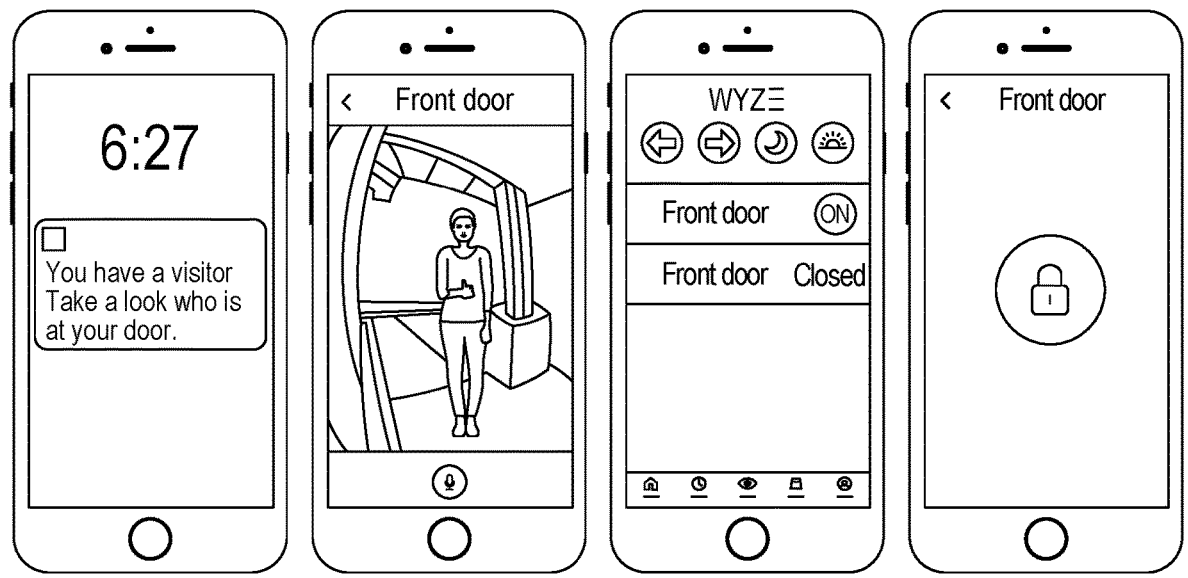
FIGS. 9A and 9B are display diagrams illustrating the user interface flow without a virtual device and with a virtual device, respectively, in accordance with some embodiments of the present technology.
Figure 9B:

FIGS. 9A and 9B are display diagrams illustrating the user interface ("UI") flow without a virtual device and with a virtual device, respectively, in accordance with some embodiments of the present technology. In particular, the illustrated embodiments show the UI flow of viewing a live stream via a doorbell camera and, based on this information, unlocking the door. As shown in FIG. 9A, without the virtual device, a user first receives a notification (e.g., smart phone touch screen) that indicates that someone is at the door (e.g., after the person at the door rang the doorbell). Selecting this notification opens a second UI showing a live stream of the front door so the user can see who is at the door. If the user would like to unlock the door, the user closes the live stream and moves to a third UI that allows the user to select the smart door lock. Upon selection of the door lock application, the door lock component opens to a fourth UI that allows the user to unlock the door (e.g., by selecting a door lock/unlock icon). If the user wanted to view the live stream to determine if the person made it in the door and/or communicate with the person via the camera audio, the user would have to toggle out of the door lock UI, and select the doorbell application to move back to the video stream viewing.

In contrast, FIG. 9B illustrates the UI flow when the abilities of the doorbell camera (e.g., live stream, 2-way audio) and the door lock (e.g., lock/unlock) are extracted from their physical devices and combined to provide a virtual device. As shown FIG. 9B, the user first receives a notification that indicates that someone is at the door. Selecting this notification opens a UI for the virtual device that provides both a live stream of the front door and a door lock/unlock control (e.g., a lock icon that lock/unlocks the door when pressed). There is no need to toggle between devices to perform different functions. Instead, the desired capabilities of both are provided together to provide a solution suitable for the front door scenario.

Figure 10:
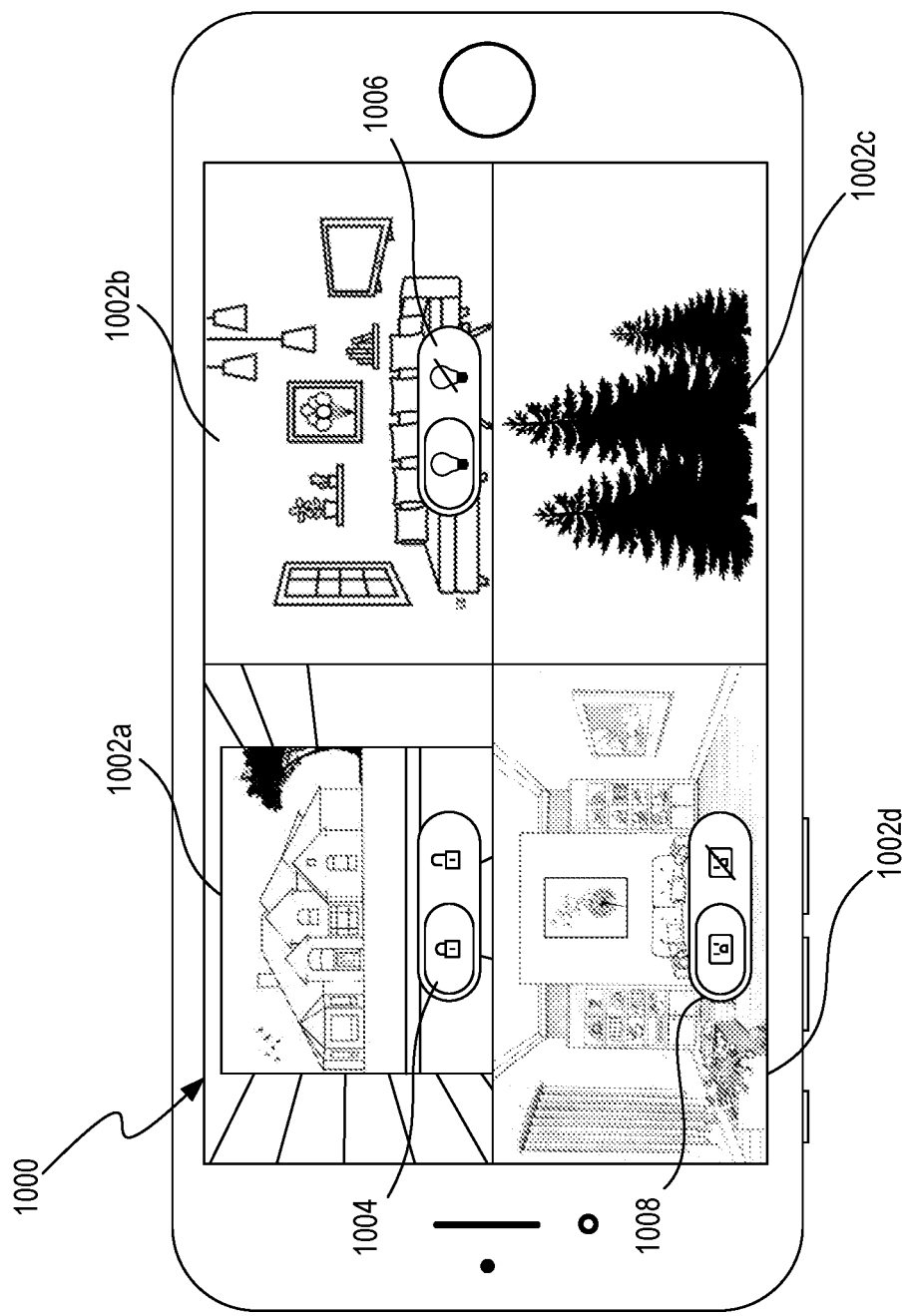
FIG. 10 is a display diagram illustrating a virtual device that can be created using a VDM system in accordance with some embodiments of the present technology.

FIG. 10 is a display diagram (e.g., a user interface) illustrating a virtual device 1000 that can be created using a VDM system in accordance with some embodiments of the present technology. The virtual device 1000, with its UI shown in a smart phone, provides multiple live stream displays 1002 (identified individually as first through fourth live stream displays 1002*a*-1002*d*, respectively) and home control features. In the embodiment illustrated in FIG. 10, the virtual device 1000 includes live stream displays 1002 from four different cameras located at different places throughout a user's home (e.g., at the front door, in a living room, directed toward a pet's cage, in an outdoor space) to generate multiple camera images. In other embodiments, the virtual device 1000 may have one, two, three, or more than four live stream displays. Each live stream display 1002 may have one or more home control features associated with its location. For example, the first live stream display 1002*a* (e.g., from a doorbell camera) may be combined with a door lock/unlock capability that can be activated by touching a lock/unlock icon 1004 on the first live stream display 1002*a*. In some embodiments, the user can configure the virtual device 1000 such that when the camera identifies a certain person, the door is automatically unlocked. The second live stream display 1002*b* may be combined with the ability to turn one or more lights in the room on or off by toggling a light bulb icon 1006 on the second live stream display 1002*b*. In some embodiments, lights may be controlled by touching the actual light shown on the camera live stream. In some embodiments, the live stream of one or more cameras may be combined with multiple lights in which case the user can turn on/off the light bulbs individually (e.g., by touching the individual lights that the user wants to turn on/off) and/or simultaneously (e.g., by touching a representative master control icon). The third live stream display 1003*b* may be combined with the ability to turn one or more electrical outlets in the room on or off by toggling a plug icon 1008 on the third live stream display 1002*c*. In some embodiments, the virtual device 1000 can include one or more home control features associated with two or more of the live stream displays 1002 to control devices in multiple locations. For example, the virtual device 1000 may include a master light control that turns all lights on or off with a single touch and/or a master lock control that locks/unlocks all doors with a single touch.

Figure 11:
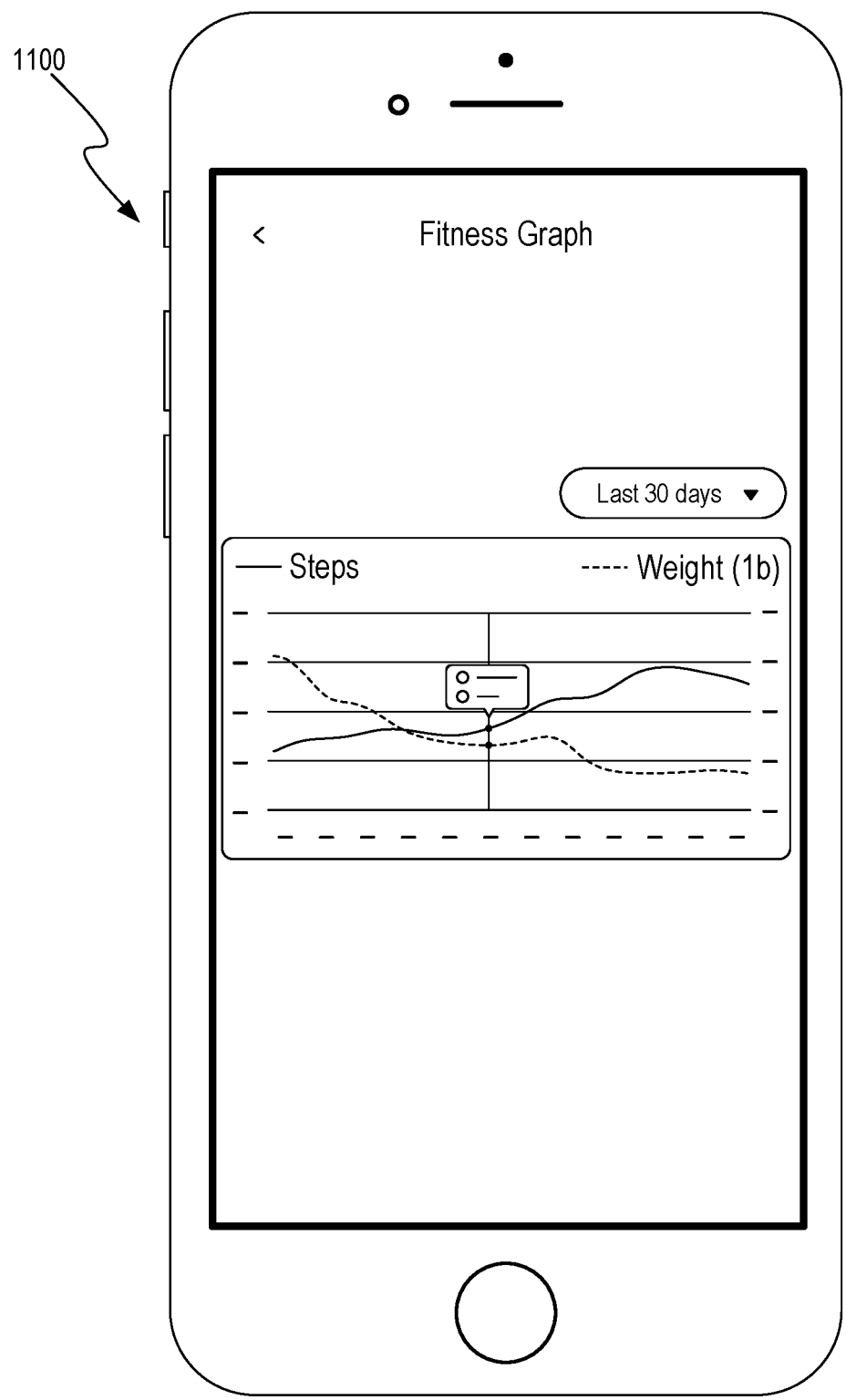
FIG. 11 is a display diagram illustrating a virtual device that can be created using a VDM system in accordance with some embodiments of the present technology.

FIG. 11 is a display diagram (e.g., a user interface) illustrating a virtual device 1100 that can be created using a VDM system in accordance with some embodiments of the present technology. The virtual device 1100, with its UI shown in a smart phone, combines the capabilities of a fitness tracker, such as a pedometer or smart watch, and a scale coupled to the VDM system. Using these two capabilities, the virtual device 1100 can display a graph overlaying a user's weight history as measured via the scale with the user's step history as tracked via the fitness tracker during the same period. This information can be used to show the correlation between the user's activity levels and the user's weight. In some embodiments, additional or other metrics from the fitness tracker (e.g., average heart rate, exercise time) can be overlaid with the user's weight and/or other parameters determined via the scale (e.g., BMI, body fat).

Other examples of virtual devices may include: a combination of a contact and/or motion sensor and a light bulb configured to turn the light on/off based on contact and/or motion detection; a combination of a contact and/or motion sensor and a camera configured to record video based on contact and/or motion detection; a combination of multiple light bulbs configured to turn the light bulbs on/off, change color and/or brightness of the light bulbs, etc.; a combination of multiple sensors configured to monitor status change; a combination of door lock with a sensor and/or camera that locks/unlocks the door in advance of detecting and/or identifying a certain type of movement (e.g., unlocking the door when detects person reaching for the door handle to exit home, but only when the person is identified as an adult or particular individual); a combination of a camera and a pet door that unlocks only when I specific animal is identified; a combination of a motion detector and a camera that records any time motion is detected and, in various embodiments, provides analytics of a person's (e.g., a child's) sleep cycle based on recordings; a combination of a camera and another connected device (e.g., a light, speaker, thermostat) that uses the camera to identify the individual in the room and adjusts the device (e.g., lighting, speaker content and/or volume, temperature) to the specific individual's preferences, which are either manually entered into the VDM system or determined automatically via previously detected lighting selections; etc.

An implementation of the VDM system may employ any combination of the embodiments described above. The processing described above may be performed by a computing system with a processor that executes computer-executable instructions stored on a computer-readable storage medium that implements the VDM system.

CONCLUSION

Although the subject matter has been described in language specific to structural features and/or acts, it is to be understood that the subject matter defined in the appended claims is not necessarily limited to the specific features or acts described above. Rather, the specific features and acts described above are disclosed as example forms of implementing the claims, and various modifications may be made without deviating from the scope of the invention. Accordingly, the invention is not limited except as by the appended claims.

Unless contrary to physical possibility, it is envisioned that (i) the methods/steps described above may be performed in any sequence and/or in any combination, and that (ii) the components of respective embodiments may be combined in any manner.

The techniques introduced above can be implemented by programmable circuitry programmed/configured by software and/or firmware, or entirely by special-purpose circuitry, or by a combination of such forms. Such special-purpose circuitry (if any) can be in the form of, for example, one or more application-specific integrated circuits (ASICs), programmable logic devices (PLDs), field-programmable gate arrays (FPGAs), etc.

Software or firmware to implement the techniques introduced here may be stored on a machine-readable storage medium and may be executed by one or more general-purpose or special-purpose programmable microprocessors. A "machine-readable medium", as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible medium can include recordable/non-recordable media (e.g., read-only memory (ROM), random access memory (RAM), magnetic disk storage media, optical storage media, flash memory devices, etc.).

Any of the steps as described in any methods or flow processes herein can be performed in any order to the extent the steps in the methods or flow processes remain logical.

Note that any and all of the embodiments described above can be combined with each other, except to the extent that it may be stated otherwise above or to the extent that any such embodiments might be mutually exclusive in function and/or structure.

We claim:

1. A method performed by one or more computing systems for creating a virtual device, the method comprising:
identifying a plurality of physical devices configurably connected to at least one controller, wherein each physical device of the plurality of physical devices includes at least one function associated with capabilities of the physical device;
extracting, via the at least one controller, the functions from the plurality of physical devices;
presenting to a user, via a user interface, a list of the plurality of physical devices available for combination to create the virtual device;
receiving from the user selection of two or more physical devices to be combined to create the virtual device;
presenting to the user, via the user interface, a list of functions that can be performed by the virtual device based on the selected physical devices;
receiving, from the user, a selection of one or more functions to be performed by the virtual device; and
creating, via the at least one controller, the virtual device to perform the selected functions of the two or more physical devices, wherein the virtual device includes automation rules associated with the selected functions of the two or more physical devices.

2. The method of claim 1, further comprising allowing the user to create a new function to be performed by the virtual device.

3. The method of claim 1, further comprising checking compatibility of the selected devices, wherein, when the selected devices are incompatible, providing an alert to a user regarding incompatibility of the selected devices.

4. The method of claim 3, wherein checking the compatibility includes checking a spatial relationship of the selected devices.

5. The method of claim 1, wherein receiving the user selection comprises receiving a first user selection of a first device, and automatically disabling selection of devices that are incompatible with the first device.

6. The method of claim 1, further comprising proactively suggesting a virtual device based on analysis of actions frequently performed by the user.

7. The method of claim 6, wherein the analysis is performed by applying one or more of machine learning algorithms.

8. The method of claim 1, further comprising presenting to the user a list of predefined recipes for creating a virtual device.

9. The method of claim 8, further comprising allowing the user to modify the predefined recipes.

10. The method of claim 8, further comprising when the user selects a recipe, displaying information regarding the recipe, the information including one or more of a name, a description, functions, and ingredients of the recipe.

11. The method of claim 1, further comprising displaying current status of the available devices.

12. One or more computing systems for creating a virtual device, the one or more computing systems comprising:
one or more computer-readable storage mediums for storing computer-executable instructions for controlling the one or more computing systems to:
identify the plurality of physical devices configurably connected to at least one controller;
extract the functions from the plurality of physical devices;
present to a user, via a user interface, a list of recipes for creating the virtual device based on the functions of the plurality of physical devices;
receive, from the user, a selection of a recipe;
in response to receiving the selection, display information about the recipe, the information including a descriptive image, a description, and ingredients;
receive an indication that the user wants to create the virtual device; and
in response to receiving the indication, define the virtual device according to the recipe, wherein the virtual device utilizes the functions of at least two of the plurality of physical devices, and wherein the virtual device includes automation rules associated with the functions of at least two of the plurality of physical devices; and
one or more processors for executing the computer-executable instructions stored in the one or more computer-readable storage mediums.

13. The one or more computing systems of claim 12, wherein the computer-executable instructions further control the one or more computing systems to allow the user to modify the selected recipe.

14. The one or more computing systems of claim 13, wherein modifying the selected recipe includes adding or removing a device or adding or removing a function.

15. The one or more computing systems of claim 12, wherein the recipes are presented based on one or more of common use cases, recipes that have been created by other users, frequency of use, and actions frequently performed by the user.

16. A virtual device management system for creating and implementing virtual devices, the system comprising:
a plurality of physical devices configured to communicate data, wherein each physical device of the plurality of physical devices includes at least one function associated with capabilities of the physical device, and wherein the plurality of physical devices includes at least a first physical device and a second physical device;
at least one controller configurably connected to the plurality of physical devices, wherein the at least one controller comprises at least one processor and at least one non-transitory memory, and wherein the at least one controller is configured to:
identify the plurality of physical devices configurably connected to the at least one controller;
extract the functions from the plurality of physical devices;
define at least one virtual device that utilizes the functions of at least the first and second physical devices, wherein the virtual device includes automation rules associated with the functions of the first and second physical devices;
present to a user, via a user interface, the at least one virtual device;
receive from the user, via the user interface, a selection of the at least one virtual device; and
create the at least one virtual device selected by the user by defining automation rules associated with data received from the first and second physical devices.

17. The system of claim 16 wherein the plurality of physical devices comprises at least two of a camera, a door lock, a doorbell, a light, a sensor, a robotic vacuum, a speaker, and an electrical outlet.

18. The system of claim 16 wherein the at least one controller is further configured to determine compatibility of the plurality of physical devices to identify which functions of the individual physical devices can be combined to create virtual devices.

19. The system of claim 18 wherein the at least one controller is further configured to identify spatial relationships between the plurality of physical devices as a parameter of compatibility for creating a virtual device.

20. The system of claim 16 wherein the at least one controller is further configured to:
present to the user, via the user interface, a list of functions associated with the plurality of physical devices; receive from the user, via the user interface, a selection of two or more functions from the list; and
configuring a new virtual device to perform the selected functions.

* * * * *